May 13, 1969     KEE-NENG WAI     3,444,290

DOSAGE UNIT FORMS FOR THE ADMINISTRATION OF MEDICAMENTS

Filed Feb. 15, 1966

INVENTOR.

Kee-Neng Wai

BY Wenderoth, Lind and Ponack ATTORNEYS

United States Patent Office 3,444,290
Patented May 13, 1969

3,444,290
**DOSAGE UNIT FORMS FOR THE ADMINISTRA-
TION OF MEDICAMENTS**
Kee-Neng Wai, London, England, assignor to
Biorex Laboratories Limited
Filed Feb. 15, 1966, Ser. No. 527,683
Claims priority, application Great Britain, Feb. 15, 1965,
6,405/65
Int. Cl. A61k 9/04
U.S. Cl. 424—4                                    7 Claims

ABSTRACT OF THE DISCLOSURE

A dosage unit which can be swallowed and which is characterized in that it swells without breaking, when in contact with gastric juices, to such a size as to be ruptured in the region of the pyloric sphincter, when swallowed. Also provided is the method of bringing an effective amount of medicament into contact with the duodenal mucosa which comprises orally administering the dosage unit to a patient.

---

Figure 1:
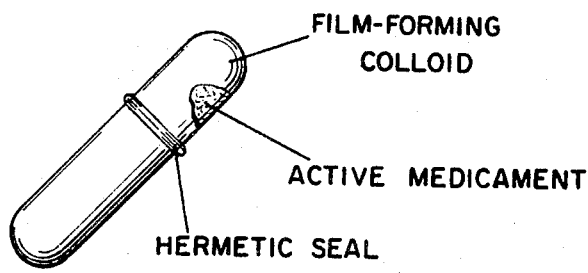

The present invention is concerned with improvements in or relating to dosage unit forms for the administration of medicaments and, more particularly, is concerned with dosage unit forms which are adapted to release their contents in the region of the pylorus.

Numerous types of dosage unit forms are already known which ensure the slow or rapid release of the contents thereof in the gastrointestinal tract. The preparation of dosage unit forms of this type does not present any great difficulties when the active ingredients present therein are intended to be released in the stomach because the contents of the stomach remain therein for a considerable period of time and thus dosage unit forms in the stomach are subjected to the physical and chemical actions prevailing therein and can be formulated in such a manner as to ensure the release of the active ingredients of the dosage unit forms in the stomach. Dosage unit forms of this type can contain active ingredients intended either to be absorbed through the gastric mucosa or to exert a healing effect on the gastric mucosa, for example, in the case of the treatment of gastric ulcers.

Special problems, however, arise when it is desired that the dosage unit forms should release their contents in the pyloric region of the stomach and/or in the duodenum in order that the active materials present therein shall be absorbed in the duodenal region or that they shall be able to exert a healing effect on the duodenal mucosa. Every time the pyloric sphincter opens, a peristaltic wave in the stomach forces a portion of the contents thereof through the duodenum into the small intestine and it has hitherto been virtually impossible to prepare dosage unit forms which will ensure a release of their active ingridients in such a manner that the said active ingredients are able to come into contact, at an effective concentration, with the doudenal mucosa for any appreciable length of time.

It is an object of the present invention to provide new types of dosage units which will, with reasonable certainty, overcome the above-mentioned difficulties and which are adapted to release the active materials in the dosage units in or near the duodenum at high concentrations so that the active materials have a greater chance of remaining in contact with the duodenal mucosa for a sufficient length of time to enable them to act upon the duodenal mucosa.

It has been known for a considerable period of time to administer medicaments orally in ordinary gelatine capsules but such capsules are readily dissolved in the stomach so that the contents thereof are released in the stomach. The result is that the contents of such gelatine capsules either may not reach the duodenum at all or may not reach the duodenum in a concentration which is high enough to be effective for the desired purpose.

According to the present invention, there is provided a dosage unit which can be swallowed and which is characterized in that it swells without breaking, when in contact with the gastric juices, to such a size as to be adapted to be ruptured in the region of the pyloric sphincter.

According to one embodiment of the present invention, there is provided a dosage unit of the capsule type which is of such a size that it can be swallowed, which is not less than 20 mm. in overall length and which swells, without bursting, when placed in simulated gastric juice for not less than 30 minutes to an increase in volume of at least 50% and which, when so swollen, can be burst by a pressure of not less than 100 mm. Hg.

According to another embodiment of the present invention, the dosage unit is of the tablet type and comprises an outer layer or coating of a non-toxic, film-forming colloid which is resistant to attack by but permeable to gastric juices, said layer or coating being adapted to be ruptured in the region of the pyloric sphincter.

The dosage unit according to the present invention may, for example, be in the form of a sealed capsule of film-forming colloid containing active materials to be administered or in the form of a compressed but easily disintegrated tablet containing active materials to be administered and coated with a film-forming colloid.

It is to be understood that the pyloric sphincter can vary somewhat in size from one subject to another. Furthermore, in the case of diseases of the pyloric region of the stomach and of the duodenum, the size of the pyloric sphincter may be increased or decreased. However, it has been found that when the dosage units according to the present invention are swallowed, have become swollen in the stomach and subsequently pass into the pylorus, a statistically significant proportion of the dosage units are ruptured and the contents thereof are liberated: the expression "adapted to be ruptured" is to be understood accordingly. Clinical trials have clearly indicated the efficacy of the dosage units according to the present invention for the administration of active materials for the treatment of diseases of the duodenum. Valuable results have been obtained with the use of capsules of size 00, i.e. with an overall length of about 20.5 mm. Capsules or coated tablets of this type can be formulated in such a manner that when they rupture, a very viscous solution is liberated which moves more slowly through the duodenum, thereby facilitating the contacting of the active materials with the duodenal mucosa for a considerably longer period of time than would normally be the case.

Examples of non-toxic, film-forming colloids which can be used according to the present invention include gelatine (treated as hereinafter detailed), partially or wholly hydrolyzed polyvinyl acetate, copolymers of vinyl alcohol and vinyl acetate, ethers and esters of cellulose, such as ethoxy-cellulose, carbomethoxy-cellulose and methyl cellulose, and plant mucilages, such as agar agar and alginates, and mixtures thereof.

It is known that gelatine capsules which have been hardened or tanned with formaldehyde are liable to aging. Recent investigations have shown that only a small quantity of formaldehyde is consumed during the treatment of gelatine capsules with formaldehyde solutions. It is very probable that the progressive hardening of formaldehyde-treated gelatine capsules on storage is mainly due to the continued reaction of gelatine with residual formaldehyde. This disadvantage is avoided, according to this invention, when capsules made from or tablets coated with gelatine or other film-forming colloids, after treatment with formaldehyde, are washed with a solvent, such as industrial methylated spirits (denatured alcohol) or alcohol (methanol, ethanol, etc.) to remove residual formaldehyde and then dried. Alternatively, residual formaldehyde can be removed by neutralization with, for example, gaseous ammonia or a solution of ammonia in a non-aqueous or aqueous organic medium or a solution of an ammonium salt, such as ammonium carbonate, in a non-aqueous or aqueous organic medium.

The formaldehyde treatment has the effect of converting the colloid into a semi-premeable membrane which is insoluble in dilute acids, such as are encountered in the stomach, but which swells and permits the passage of small molecules, for example, water, mineral acids and inorganic electrolytes. Disaccharides, such as lactose, do not appear to pass through the semi-permeable membrane easily. Capsules and coated tablets treated in this manner appear to provide good protection to their contents when these are known to be hygroscopic and sensitive to moisture. All the capsules and coated tablets appear to be stable for at least three months, whether stored e.g. in well-closed aluminum containers or exposed to the atmosphere.

It is to be understood that the dosage units according to the present invention must be hermetically sealed. This can be achieved, for example, in the case of capsules or coated tablets, by sealing them with a solution of gelatine or of another suitable adhesive, such as a cellulose ether, for example, a methyl cellulose, with or without the use of a plasticizer. The sealing can also be accomplished by placing a strip of film-forming colloid over the join in the capsule. In the case of tablets, these can be press-coated with a film-forming colloid and then sealed with a jet of steam.

The formaldehyde treatment can be carried out with solutions, of any suitable strength, of formaldehyde in water or in aqueous organic solvents, such as aqueous alcohol. It has been found to be convenient to use, for this treatment, commercial or B.P. solutions of formaldehyde, commonly referred to as formalin, i.e. 37–41% w./v. aqueous solutions of formaldehyde which may contain a variable amount of methanol or ethanol.

The tanning or hardening of the gelatine or other film-forming colloids can be carried out not only with the use of formaldehyde in the above-described manner but also with the use of other suitable, non-toxic tanning or cross-linking agents such as tannic acid, ethylene oxide or glutaraldehyde. When using, for example, an aqueous solution of formaldehyde, this aqueous solution preferably also contains a non-aqueous solvent, such as methanol, ethanol, industrial methylated spirits, isopropanol or acetone, the water allowing the reagent used to penetrate the colloid and the non-aqueous solvent preventing swelling of the capsule or coated tablet.

According to a special feature of the dosage units of the present invention, they can also contain one or more components which are capable of evolving a non-toxic gas, provided that these components and the gas evolved are not incompatible with the active materials in the dosage units. The gas so evolved when the gastric juices permeate into the dosage units will then result in an increase in tension in the interior of the dosage units, thereby preserving their shape and increasing their dimensions, and will also result in an explosion of the dosage units when they are subjected to mechanical stresses in the pylorus, with the result that the viscous solution resulting from the disintegration of the dosage units will forcibly impinge on the walls of the neighboring mucosa and adhere thereto for some time. Examples of materials which may be incorporated into the dosage units are which are capable of evolving gas, include sodium bicarbonate alone or in admixture with citric acid or tartaric acid.

If the swollen dosage units do not retain their shape after having been soaked in the gastric juices or if they are too hard and tough or if they are too soft and pliable, there is always the possibility that they will be able to pass through the plyorus without bursting. The presence of gas-releasing components in the dosage units assists the bursting of the swollen dosage units when passing through the pylorus. This retention of shape can also be ensured or assisted by including, in the dosage units, non-toxic compounds, such as water-soluble salts, for example, sodium chloride or potassium chloride, or sugars, for example lactose, sucrose or mannitol, which will produce a high osmotic pressure in the interior of the dosage unit.

It is to be understood that any desired active materials may be placed in the new dosage units of the present invention. These dosage units are of particular value for treating duodenal ulcers with the disodium salt of glycyrrhetinic acid hemisuccinate (see British Patent No. 843,133), which has already proved to be outstandingly successful in the treatment of gastric ulcers. This disodium salt is also known as carbenoxolone sodium and as "Biogastrone."

Figure 2:
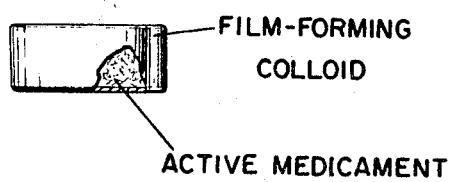

On the accompanying sheet of drawings,

FIG. 1 diagrammatically shows the capsule type of embodiment according to the invention, while FIG. 2 is a diagrammatic showing of a tablet type embodiment. It will be understood the gelatine or the like coating on the tablet swells but remains intact until burst by pressure as described, supra.

The following examples of presently preferred embodiments are given for the purpose of illustrating the present invention. All the dosage units specifically exemplified have been shown to swell in the manner desired according to the present invention. The capsules described in some of these examples contain barium sulphate and not an active ingredient in order that their behavior in the stomach and duodenum may be followed radiologically. However, as explained above, the capsules can contain any desired active materials. Furthermore, all the capsules in the following examples were handfilled and also extended as indicated to up to about 28 mm. in length.

EXAMPLE 1

Each capsule contains:

|  | Mg. |
|---|---|
| Barium sulphate | 750 |
| Sodium chloride | 125 |
| Lactose | 600 |
| Tartaric acid | 15 |
| Sodium bicarbonate | 15 |

The capsules, which were "00" gelatine capsules, were sealed with aqueous glycerinated gelatine. They were placed in a solution of formalin (50%) and ethanol (50%) for 30 minutes and then placed in ethanol and tested under vacuum for leakage. After washing with ethanol, the capsules were dried.

The capsules were placed in a tablet disintegration tester with simulated gastric juice. They swelled rapidly as soon as they were in contact with water. At the end of 30 minutes, the capsules were removed from the tester and their bursting pressure determined. It should be about 600 mm. Hg.

These capsules remain intact in the stomach but rupture just before entering the duodenum.

EXAMPLE 2

Each capsule contains:

|  | Mg. |
|---|---|
| Barium sulphate | 300 |
| Tartaric acid | 50 |
| Sodium bicarbonate | 50 |
| Sodium chloride | 100 |
| High polymer (ethylhydroxyethylcellulose) | 500 |

The capsules, which were "00" gelatine capsules, were sealed with an aqueous solution of gelatine. They were then hardened and processed as in Example 1.

The capsules were placed in a tablet disintegration tester with simulated gastric juice (pepsin omitted). The capsules swelled rather rapidly and ruptured in 15 to 20 minutes. At the end of one hour, only the coating and several lumps of soft residue were left.

The capsules rupture near the pylorus and form a very viscous solution which will assist in carrying the contents of the capsule to the site of an ulcer.

The high polymer, above-mentioned, forms a colloidal suspension inside the capsule and maintains the rigidity of the swollen capsule. A commercially available product is "Modocoll E," but other similarly acting high polymers may be used.

EXAMPLE 3

Each capsule contains:

| | Percent |
|---|---|
| Tartaric acid | 1 |
| Sodium bicarbonate | 1 |
| Inert ingredients or active ingredients | 98 |

In this formulation, the tartaric acid reacts with the sodium bicarbonate upon contact with gastric juice and liberates carbon dioxide which keeps the capsule inflated. The "00" gelatine capsule was sealed, hardened and further processed as in Example 1.

EXAMPLE 4

Each capsule contains:

| | Percent |
|---|---|
| Lactose | 50 |
| Inert or active ingredients | 50 |

Lactose, which is rapidly soluble in gastric juice, but the large molecule of which does not readily pass through the semi-permeable capsule wall, maintains a high osmotic pressure inside the "00" gelatine capsule. The osmotic pressure inside the capsule keeps it inflated. The capsule ("00" gelatine) was sealed, hardened and further processed as in Example 1.

EXAMPLE 5

Each capsule contains:

| | Percent |
|---|---|
| Ethylhydroxyethylcellulose (high polymer) | 20 |
| Sodium chloride | 10 |
| Inert or active ingredients | 70 |

The high polymer, e.g. Modocoll E–1200, forms a colloidal suspension inside the "00" gelatine capsule and maintains the rigidity of the swollen capsule. Sodium chloride was included to maintain the osmotic pressure at the initial stage and to depress the swelling of the polymer so that it can be wetted thoroughly by the gastric juice. The capsule was sealed, hardened and further processed as in Example 1.

EXAMPLE 6

Each capsule contains:

| | Mg. |
|---|---|
| Carbenoxolone sodium | 50 |
| Lactose | 730 |
| Sodium chloride | 100 |
| Ethylhydroxyethylcellulose (high polymer) | 100 |
| Sodium bicarbonate | 10 |
| Tartaric acid | 10 |

The ingredients were mixed and encapsulated in size "00" gelatine capsules. The capsules were sealed with glycerinated gelatine and then hardened and processed as in Example 1.

EXAMPLE 7

Each capsule contains:

| | Mg. |
|---|---|
| Carbenoxolone sodium | 50 |
| Lactose | 550 |
| Potassium chloride | 100 |
| Ethylhydroxyethylcellulose (high polymer) | 50 |
| Sodium bicarbon | 15 |
| Anhydrous citric acid | 35 |

The ingredients are all dried in an oven prior to use. The carbenoxolone sodium, being very hygroscopic, is dried in reduced pressure at 80° C. The potassium chloride and citric acid are reduced to fine powders. The potassium chloride, citric acid powder and the high polymer are mixed together and then half of the lactose gradually added (powder I). The sodium bicarbonate is mixed with the carbenoxolone sodium and gradually added to the other half of the lactose (powder II). Powders I and II are then mixed together. This final mixture is encapsulated in size "00" gelatine capsules which are then sealed with glycerinated gelatin. The capsules are then hardened and processed as in Example 1.

EXAMPLE 8

Gelatine capsule hardened with formaldehyde

The capsule, which is a size "00" gelatine capsule of suitable length, is filled with 800 mg. lactose and sealed with a band of gelatine. It is placed in a solution of formalin (50%) and ethanol (50%) for 30 minutes, then tested for leakage in ethanol under vacuum and subsequently washed thoroughly with ethanol and dried.

The capsule swelles slowly in the stomach. The swollen capsule cannot normally pass the pyloric orifice and releases its contents when burst by the pressure of the pylorus.

EXAMPLE 9

Capsule containing a water-soluble drug

The capsule contains:

| | Mg. |
|---|---|
| Carbenoxolone sodium | 50 |
| Lactose | 800 |

The capsule, which is a size "00" gelatine capsule of suitable length, is sealed with a band of gelatine. It is placed in a solution of formalin (50%) and ethanol (50%) for 30 minutes, then tested for leakage in ethanol under vacuum, washed thoroughly with ethanol and dried. This capsule possesses similar physical properties to that produced in Example 8.

EXAMPLE 10

Capsule containing a water-insoluble drug

The capsule contains:

| | Mg. |
|---|---|
| Barium sulphate | 300 |
| Lactose | 800 |

The capsule, which is a size "00" gelatine capsule, of suitable length, is sealed with an aqueous solution of gelatine. It is placed in a solution of formalin (50%) and ethanol (50%) for 30 minutes, then tested for leakage in ethanol under vacuum, washed thoroughly with ethanol and dried. This capsule possesses similar physical properties to that produced in Example 8.

EXAMPLE 11

Capsule containing a gas-generating mixture

The capsule contains:

| | Mg. |
|---|---|
| Mannitol | 800 |
| Tartaric acid | 10 |
| Sodium bicarbonate | 10 |

The capsule, which is a size "00" gelatine capsule of suitable length, is sealed with a band of gelatin. It is placed in a solution of formalin (50%) and ethanol (50%) for 30 minutes, then tested for leakage in ethanol under vacuum, washed thoroughly with ethanol and dried.

This capsule swells within 15 minutes, after ingestion into the stomach. The capsule releases its contents when it is burst by the pressure of the pylorus.

EXAMPLE 12

Capsule containing a viscosity-producing agent

The capsule contains:

| | Mg. |
|---|---|
| Ethylhydroxyethylcellulose (high polymer) | 80 |
| Tartaric acid | 20 |
| Sodium bicarbonate | 20 |
| Sucrose | 680 |

The capsule, which is a size "00" gelatine capsule of suitable length, is sealed with a band of gelatine. It is placed in a solution of formalin (50%) and ethanol (50%) for 30 minutes, then tested for leakage in ethanol under vacuum, washed thoroughly with ethanol and dried.

EXAMPLE 13

Capsule containing a water-soluble drug

The capsule contains:

| | Mg. |
|---|---|
| Carbenoxolone sodium | 50 |
| Spray-dried lactose | 610 |
| Ethylhydroxyethylcellulose (high polymer) | 80 |
| Tartaric acid | 20 |
| Sodium bicarbonate | 20 |
| Magnesium stearate | 20 |

The capsule, which is a size "00" gelatin capsule, extended to a length of about 27 mm., is sealed with a band of gelatine. It is place in a solution of formalin (50%) and ethanol (50%) for 30 minutes, then tested for leakage in ethanol under vacuum, washed thoroughly with ethanol and dried.

The dosage units described in the above examples provide excellent protection for their contents when they are exposed to the atmosphere; although the contents are spoiled by contact with moisture, they appear to be quite stable inside the capsule which was exposed to the atmosphere for three months.

What I claim is:

1. A dosage unit which can be swallowed and which is characterized in that it swells without breaking, when in contact with gastric juices, to such a size as to be ruptured in the region of the pyloric sphincter, when swallowed, said dosage unit being a capsule not less than 20 mm. in overall length, of gelatine or other swellable film-forming colloid, disintegratable to a viscous solution which will forcibly impinge on and adhere to mucosa walls, hermetically sealed and rendered resistant to attack by but permeable to gastric juices by having been subsequently placed in a hardening solution of formalin and thereafter washed until residual formaldehyde is removed, and dried, said capsule containing therein an effective peroral dosage unit quantity of barium sulphate, carbenoxolone sodium, or other agent or medicament having a diagnostic effect in the duodenal region or having a healing effect on the duodenal mucosa; and further containing (a) a quantity of non-toxic water soluble salts or sugars effective to produce a high osmotic pressure in the interior of the dosage unit, when ingested; and/or (b) gas-evolving quantities of sodium bicarbonate alone, or in further admixture with an acid such as citric acid or tartaric acid, sufficient when the gastric juices permeate into the dosage unit, as to result first in an increase in tension in the interior of the dosage unit, thereby preserving its shape and increasing its dimension, and also later on in an explosion of the dosage unit when it is subjected to mechanical stresses in the pylorus; said capsule which may further contain (c) a quantity of ethylhydroxyethylcellulose or other swellable colloidal suspension-forming polymer sufficient to maintain the rigidity of the swollen capsule.

2. A dosage unit according to claim 1 wherein the formalin solution additionally contains a non-aqueous solvent.

3. A dosage unit according to claim 2, wherein the non-aqueous solvent is methanol, ethanol, industrial methylated spirits, isopropanol or acetone.

4. A dosage unit in the form of a capsule according to claim 1, wherein said capsule is hermetically sealed by gelatine or cellulose ether, with or without the use of a plasticizer, or by a strip of film-forming colloid over the joint in the capsule.

5. A dosage unit according to claim 1, wherein the dosage unit has a size at least equal to that of a size "00" capsule.

6. A dosage unit according to claim 1, wherein the active ingredient is carbenoxolone sodium.

7. In a method for forcibly impinging on the duodenal mucosa, and adhering thereto, a viscous solution of gelatin or other swellable film-forming colloid and an effective amount of an agent having a diagnostic effect in the duodenal region or having a healing effect on the duodenal mucosa the improvement which consists of the step of orally administering to a patient a disintegratable gelatin or other swellable film-forming colloid dosage unit according to claim 1.

References Cited

UNITED STATES PATENTS

| 2,526,683 | 10/1950 | Murphy | 167—83 |
| 2,659,690 | 11/1953 | Slaybaugh | 167—95 |
| 2,887,440 | 5/1959 | Greminger et al. | 167—82 |
| 3,017,329 | 1/1962 | Dulmage | 167—95 |
| 3,070,623 | 12/1962 | Gottfried et al. | 260—468.5 |
| 3,131,123 | 4/1964 | Masquelier | 167—57 |
| 3,228,789 | 1/1966 | Glassman | 117—118 |
| 3,275,519 | 9/1966 | Glassman | 167—82 |

FOREIGN PATENTS 843,133   8/1960   Great Britain.

LEWIS GOTTS, *Primary Examiner.*

S. K. ROSE, *Assistant Examiner.*

U.S. Cl. X.R.

424—14, 16, 37, 44, 313, 362